April 16, 1963     T. S. ZAJAC ET AL     3,085,592
VALVE MECHANISM
Filed June 5, 1959
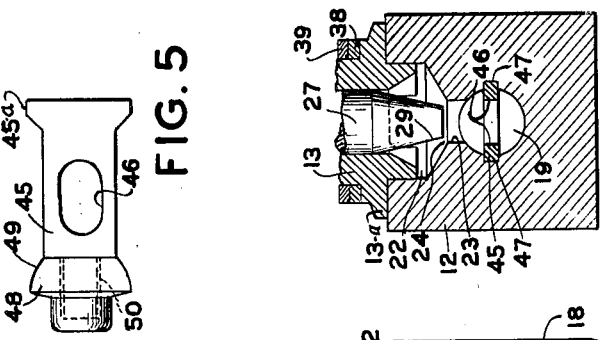
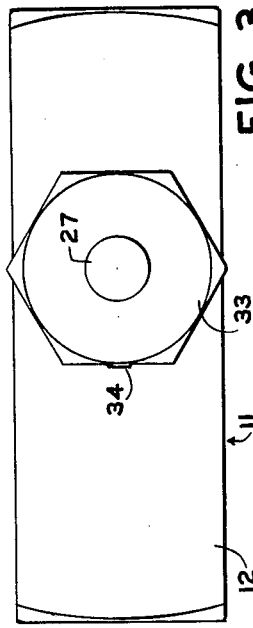
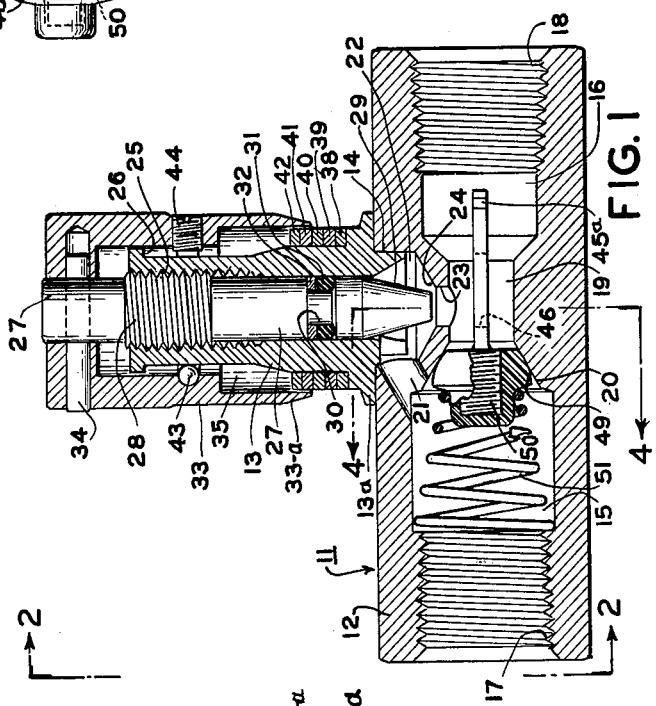
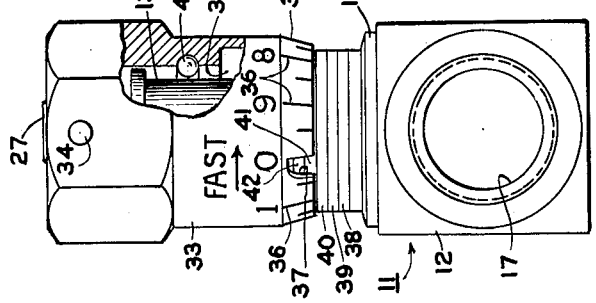
INVENTORS
THEODORE S. ZAJAC
JULIUS W. ZAJAC
BY *Woodling and Krost*
ATTORNEYS () # 3,085,592
VALVE MECHANISM
Theodore S. Zajac, Parma, and Julius W. Zajac, Cleveland, Ohio, assignors to The Manatrol Corporation, a corporation of Ohio
Filed June 5, 1959, Ser. No. 818,391
6 Claims. (Cl. 137—556)

Our invention relates to valve mechanism for controlling the flow of fluid therethrough.

An object of our invention is to provide an improved valve mechanism incorporating a metering valve and check valve in an efficient construction.

Another object is the provision of a valve mechanism of means for visually indicating by readily observable external means the metering position of the valve.

Another object is the provision in a control valve for showing the setting of the control valve in a unique and highly useful manner.

Another object is the provision for indicating the position of a control valve, that is, its degree of closure and openness, by a series of annular members having readily differentiated color indicia.

Another object is the provision of a check-valve structure which permits its ready and close association with a control valve without undue restriction of the flow of fluid through the control valve.

Another object is the provision of a check valve so constructed as to assure proper sealing and to prevent cocking or tilting of the check valve.

Another object is the provision of a valve structure combining in a novel manner unique features so arranged as to give advantages in use and services over prior valve mechanisms.

Another object is the provision of a unique structure and combination of structural features operating in a new manner and producing results heretofore unobtainable.

Other objects and a fuller understanding of the invention may be had by referring to the following description and claims, taken in conjunction with the accompanying drawing, in which:

FIGURE 1 is a longitudinal sectional view taken through a valve mechanism incorporating the preferred form of our invention;

FIGURE 2 is an end view of the valve mechanism incorporating our newly invented features and looking in the direction of the arrows 2—2 of FIGURE 1;

FIGURE 3 is a plan view looking down on the valve mechanism shown in FIGURE 1;

FIGURE 4 is a cross-sectional view taken through the line 4—4 of FIGURE 1;

FIGURE 5 is a plan view of the check-valve member removed from the valve mechanism shown in FIGURES 1 and 4; and FIGURE 6 is a perspective view of one of the annular members mounted on the valve mechanism for indicating closure position of the control valve.

Our valve mechanism includes a hollow body indicated generally by the reference character 11. This body 11 has a longitudinal portion 12 arranged along a common axis and through which fluid is adapted to flow. Extending from one side thereof at right angles to the axis of the part 12 is a projected portion 13 of the body 11. The part 13 is brazed or silver soldered at 14 to the longitudinal part 12 so that parts 12 and 13 in effect become an integral hollow body with part 13 projecting at right angles at one side thereof. The part 13 has a flange 13–a which abuts the side of the part 12 as shown.

In one end of the body part 12 there is a first chamber 15 and at the other end of the body part 12 there is a second chamber 16. The first end of the body part 12 has an internally threaded open end 17 and the second or opposite end of the body part 12 has a second internally threaded open end 18. The threaded ends 17 and 18 are adapted to be connected to pipes or other conduits in such manner that fluid flows through the body part 12 from one conduit to the other.

Disposed axially of the body part 12 and providing communication between the chambers 15 and 16 is a cylindrical bore 19. As seen in the drawing, the diameter of the bore 19 is smaller than the diameter of the chamber 15 and the diameter of the chamber 16. The internal wall of the body part 12 is such that there is provided a valve seat 20 of frusto-conical form extending from the chamber 15 to the cylindrical bore 19.

Also communciating with the chamber 15 there is an opening 21 at a position in advance of the valve seat 20. This opening 21 communicates with an open space 22 which is provided between the lower end of the projecting body part 13 and the recess in which the projecting body part 13 is accommodated in the longitudinal body part 12. A port 23 extends through a wall in the valve body part 12 intermediate of the ends of the bore 19 so as to provide communication between the open space 22 and the bore 19. Thus the opening 21, open space 22 and port 23 together form a passageway from chamber 15 to bore 19, this passageway being disposed to one side of the axis of the body part 12 and by-passing direct communication through the body part 12 through the portion defined by the frusto-conical valve seat 20.

The projecting body part 13 has an internally threaded bore 25 and a needle-valve spindle or shaft 27 has a threaded portion 28 which is threadably engaged to the threaded bore 25. The threaded engagement is such that turning of the needle-valve spindle or shaft 27 causes axial movement of the needle valve. The forward or inner end of the needle valve has a tapered nose 29 which moves toward and away from the port 23 as the needle-valve spindle is rotated. The edge of the port 23 provides a valve seat 24 against which the nose portion 29 may engage. The distance of the tapered nose 29 relative to the valve seat 24 determines the amount of flow of fluid that is permitted through the port 23. Thus by changing the axial position of the needle valve, the flow of fluid from chamber 15 through opening 21, open space 22, port 23, and hence out through bore 19 to chamber 16 is controlled or metered.

The needle-valve shaft 27 has an annular groove 30 in which is positioned a rubber O-ring 31 and a back-up ring 32 for providing a good seal between the projecting body part 13 and the needle-valve spindle or shaft 27.

A sleeve member 33 closed at its upper end and open at its lower end, as seen in FIGURES 1 and 2, is secured to the upper or free end of the needle-valve shaft 27 by means of a lock pin 34 extending through aligned openings in the shaft and sleeve member. Thus, the sleeve member 33 is secured to the needle-valve shaft 27 so that they rotate together and they longitudinally move together along the axis of the needle-valve shaft 27. Within the open end of the sleeve member 33 at its most inward end, there is an annular space 35. This annular space 35 is such as to provide a clearance between the lower open end of the sleeve member 33 and the projecting body part 13, as shown in the drawing. The projecting part 13 has an annular flange 26 adjacent its upper end. One or more steel balls 43 are positioned in an annular groove internally of the sleeve member 33 and such steel ball 43 acts as a stop or limit which, upon engaging the flange 26, prevents withdrawal of the sleeve member 33 in an axial upper direction away from the projecting body part 13. The ball stop 43 is introduced into the annular groove through a radially directed threaded opening in the side of the sleeve member 33 in which a set screw 44 is threadably engaged with the ball 43 held in position in the annular groove, which prevents the withdrawal of the sleeve member and needle valve in an axial direction beyond the limit provided by the flange 26. The set screw 44 besides permitting the introduction of the ball 43 into the annular groove also permits the sleeve member 33 to be secured in a desired fixed position relative to the body part 13 by turning the set screw 44 inwardly to the position where it tightly abuts the outer wall of the body part 13.

Concentrically mounted around the body part 13 above the flange 13-a are five annular members, washers or rings 38, 39, 40, 41 and 42. These rings are flat and are stacked tightly together in consecutive order. The rings 38–42, inclusive, are of uniform thicknesses and of uniform inner and outer diameters. The rings 38–42, inclusive, are press-fitted about the cylindrical outer wall of the body part 13 so that they are in fixed position and, in effect, are permanently secured to the body part 13. The rings or washers are of different colors readily observable so as to distinguish one from the other. For example, in the preferred embodiment, the ring 38 is green, the ring 39 is orange, the ring 40 is blue, the ring 41 is aluminum or silver-colored, and the ring 42 is red. Because of the uniform thicknesses of the rings, the dividing lines between adjacent rings of the plurality of rings are fixed graduation marks indicating distances longitudinally of the projecting body part 13.

As seen in FIGURE 2, there are also gradation marks 36 extending uniformly circumferentially of the sleeve member 33 adjacent its lower open end. The gradation marks, for example, may be from zero to 9 to indicate ten uniform distances disposed circumferentially of the sleeve member. Adjacent one of the gradation marks, as for example, adjacent the gradation mark "zero," as seen in FIGURE 2, there is an open space or cutout 37 which uncovers or exposes at that point the annular ring or rings under the sleeve member 33 and within the annular open space 35. This aids in clearly disclosing the next rings to appear upon outward axial movement of the sleeve member 33.

By means of the differentially colored rings, one may very easily and quickly ascertain the position of the needle-valve nose 29 relative to its associated valve seat 24, even though the nose 29 and valve seat 24 are positioned internally of the valve and are not observable from the outside. Also the rotational position of the sleeve member, and hence of the needle valve, may be readily ascertained by comparing the gradation marks 36 with a fixed reference point on the body 11.

The arrangement permits the ready setting of the control valve by instructions and also for the ready notation of a setting so that the control valve may be reset at another time in accordance with the prior recorded notation. For example, an operator may be told to set the control or metering valve at "Red" and in following such instructions, the operator will manually turn the sleeve member 33 and hence the needle valve shaft 27 to such a position that the lower edge of the sleeve member 33 fully uncovers the ring 42 which is colored red. This would indicate the greatest open position of the control or metering valve. Again, the operator may be instructed to set the control valve at "Orange" and in that case the sleeve member would be rotated to the position where the ring 39 of orange color would be uncovered but the ring 40 of blue color would not be uncovered. If the operator were instructed to set the valve at position "blue plus 3," he would turn the needle valve so that the ring 40, which is blue, was fully uncovered and, in addition, would rotate the sleeve member to where the FIGURE 3 of the gradation marks 36 was aligned with a fixed reference point on the body and this would be approximately the position shown in FIGURES 1 and 2, where only a fraction of the ring 41 of aluminum color is disclosed. The full thickness of the ring 41 is observable only through the open space or cutout 37. Our valve mechanism operating under favorable flow conditions may have been observed to have a setting of a certain degree, such as a setting on orange ring 39, plus a fractional turn indicated by a mark "5" of the gradation marks 36, and such a reading may be noted. The valve mechanism may then be taken out of the line for repair of the line and, after replacement in the line, the control valve may then be set at the same degree of closure by again turning the needle valve to the reading of "orange plus 5." Unskilled persons may thus readily set the control valve and reset it as required by merely observing the colored rings indicating the axial position of the needle valve and hence its degree of closure.

It is preferred that each ring thickness be substantially equal to the pitch of the threads on the threaded portion 28 of the needle valve so that each complete turn of the needle valve covers or uncovers one complete colored ring. Other ratios of thread pitch to thickness of the rings may be used if desired.

A check valve is positioned so as to check the flow of fluid in one direction through the bore 19 between the chambers 15 and 16. The check valve has a plate portion 45 shown horizontally disposed in the valve body of FIGURES 1 and 4. The bore 19 has two oppositely disposed slots or grooves 47 disposed therein and the opposite longitudinal edge portions of the plate portion of the check valve slidably fit within these slots 47. This provides for guided longitudinal movement of the check valve relative to the bore 19 and prevents cocking of the check valve and assures sliding movement along the axis of the bore 19. Extending through the plate portion 45 of the check valve and intermediate its ends is an open space 46 which is longer than its width, as seen in FIGURE 5. This open space 46 is disposed opposite the port 23 and arranged so that fluid flowing into the bore 19 from the port 23 may readily and without undue restriction flow directly across from one side of the bore 19 adjacent the port 23 to the other side. Thus, the flow of fluid through the bore 19 by reason of the presence of the plate portion 45 is not unduly restricted or limited. The oval shape of the open space 46 is such that the open space 46 is opposite the port 23 regardless of the longitudinal position of the check valve along the axis of the bore 19.

Secured to one end of the plate portion 45 is a nylon valve head 48. A suitable way of securing the valve head 48 to the plate portion 45 is by having the end of the plate portion 45 threaded, as at 50, and threadably engaged in a threaded recess within the valve head 48 so as to firmly engage the parts together. The nylon valve head 48 has a sealing surface 49 which is directed toward the valve seat 20 so as to sealingly engage therewith. The sealing surface 49 of the valve head 48 is disposed on a radius as viewed in FIGURES 1 and 5 generated about a center on the axis of the bore 19, which center is positioned on the axis rearwardly of a plane passing through the line of contact between the sealing surface 49 and the valve seat 20. Thus, the curvature of the sealing surface 49 is such that it curves forwardly and radially inwardly as it extends toward the bore 19. The radial curve of the sealing surface 49 thus does not fully complement the frusto-conical surface of the valve seat 20. As the nylon of the valve head 48 is somewhat resiliently yieldable in nature, the valve head 48 at the point of engagement of the sealing surface 49 and the valve seat 20 tends to conform to the frust-conical shape of the seat 20 and thus provides a good sealing interengagement between the nylon valve head and the metal valve seat. The material and the shapes shown and described together provide a good sealing engagement for the check valve. The head 48 may also be of "Teflon," rubber or other good sealing material, or be of metal having a sealing surface portion of such sealing material.

A partially conical coil spring 51 having its larger end abutting a shoulder in the chamber 15 and its smaller end abutting the valve head 48, as shown in FIGURE 1, resiliently urges the check valve into the closed position shown in FIGURE 1. The concentric position of the spring 51 is maintained by having the smaller end of the spring encircling the small end or projecting part of the valve head 48. The spring 51 normally maintains the check valve in the closed position of FIGURE 1. However, when the fluid pressure in chamber 16 is sufficiently high relative to the fluid pressure in chamber 15, then the bias of the spring 51 is overcome so that the check valve opens to the position where the valve head 48 is unseated from the seat 20 and fluid may flow through the bore 19 from the chamber 16 to the chamber 15. Under the usual flow conditions, however, the balance of fluid pressure is such that the check valve is closed and only a metered or controlled amount of fluid flows from chamber 15 to chamber 16 through the passageway composed of opening 21, open space 22 and port 23, and hence out through bore 19 to chamber 16. The amount of flow is metered or controlled by the position of the needle valve which, in turn, is indicated by the location of the lower edge of the sleeve member 33 relative to the plurality of rings 38–42, inclusive, of differing colors readily observable from the outside of the valve mechanism.

A convenient manner of mounting the check valve within the body is to insert the plate portion 45 through the open end 18 and into the bore 19 with the longitudinal side edges within the slots or grooves 47. The larger end 45–a of the plate portion 45 provides a stop limiting longitudinal movement of the check valve mechanism to the left in FIGURE 1. With the plate portion 45 moved as far as possible to the left, that is, toward opening 17, then the valve head 48 with spring 51 is inserted through the opening 17 of the body part 12. The larger end of the spring 51 is compressed or coiled sufficiently to get it through the threaded portion of the end 17 and thus to fit within the chamber 15. With the valve head 48 pressed longitudinally of the axis of the body 11 and against the threaded end 50 of the plate portion 45, the valve head 48 is rotated on its axis by means of an appropriate tool inserted through the end 17 so as to threadably interengage the head 48 on the plate portion 45. This assembles the parts of the valve mechanism and secures them to the position illustrated in FIGURE 1, the valve mechanism being movable between limits determined by the valve head 48 and the enlarged end 45–a of the plate portion 45.

By the structure and arrangement shown and described, a most useful and convenient valve mechanism is provided which permits ready and easy observation of the setting of the valve and which permits the control valve and check valve to be closely associated without one interfering with the operation of the other.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A valve mechanism comprising in combination a hollow body having a valve seat defining an orifice through which fluid may flow in passing through the hollow body, a needle-valve member movable toward and away from said valve seat for controlling the flow of fluid through said orifice, said hollow body having a cylindrical portion extending therefrom for accommodating said needle valve member, said needle-valve member having a threaded stem and said cylindrical portion having a threaded bore threadably interengaged with said threaded stem, a sleeve member non-rotatably secured to said needle-valve member, said sleeve member being mounted concentric with said needle-valve member and said cylindrical portion, a plurality of annular members of uniform thicknesses concentrically mounted in a series on said cylindrical portion, the thickness of each of said annular members being substantially equal to the pitch of the threads on the threaded portion of said needle-valve member to provide that each rotation of the needle-valve member provides axial movement thereof substantially the same as the thickness of a said annular member, adjacent of said annular members carrying different color indicia to provide ready color differentiation of the axial positions of the respective said annular members along said cylindrical portion, said sleeve member having a bore adapted to accommodate therein said annular members upon turning the sleeve member and needle-valve member in a direction to move the needle-valve member toward said valve seat, said cylindrical portion having a flange extending radially therefrom at an axial distance from said annular members, stop means engaging said sleeve member and interposed between said sleeve member and said cylindrical portion to engage said flange upon movement of the sleeve member in an axial direction away from said valve seat to the limit provided by said flange to retain the sleeve member on said cylindrical portion, said sleeve member having an annular edge portion at an open end thereof and outwardly of said bore, said annular edge portion having a series of gradation marks disposed at intervals around the circumference of said edge portion to indicate the rotational position of the sleeve member and needle-valve member relative to a fixed point of reference on said body, the said sleeve member being disposed to cover and to accommodate in said bore such of said annular members as is determined by the axial position of the sleeve member and needle-valve member relative to said valve seat, the axial spacing of said needle-valve member relative to said valve seat in said body being readily determined by the observation of the particular annular members uncovered by said edge portion and of the position of said gradation marks relative to said point of reference.

2. A valve mechanism as defined in claim 1, and in which said sleeve member has an axially extending open space in said edge portion at a location adjacent a said gradation mark to disclose at said location the particular annular member in said bore most adjacent the said open end of said sleeve member.

3. A valve mechanism comprising in combination, a hollow body having a valve seat surrounding a metering opening in the hollow body, a valve member reciprocal relative to said valve seat for governing flow of fluid through said metering opening, said valve member having a stem, said body having a tubular portion extending outwardly therefrom in axial alignment with said stem for accommodating said stem, said tubular portion having an internal threaded portion and said stem having an external threaded portion, said threaded portions of the tubular member and of said stem being threadably interengaged whereby the valve member is moved along its axis relative to said valve seat upon rotation of the said stem, said stem having an end portion extending outwardly from said tubular portion at the free end thereof, a sleeve member axially aligned with, and embracing, said stem and tubular portion, said sleeve member at its outer end being fixedly secured to the said end portion of the stem whereby rotation of the sleeve member rotates the said stem and the sleeve member and stem move together in an axial direction, said tubular portion having a flange extending radially thereof adjacent its outer end and within said sleeve member, stop means carried by said sleeve member intermediate said sleeve member and tubular portion and positioned to engage said flange upon movement of the sleeve member outwardly to the limit provided by said flange to retain the sleeve member on said tubular portion, locking means carried by said sleeve member, and positioned to inter-engage with said tubular portion at different locations within the sleeve member to selectively lock the sleeve member against movement relative to the tubular portion for holding the needle-valve member in respective selected positions, said sleeve member at its opposite and inner end being spaced radially from said tubular member to define an annular open space therebetween, said sleeve member at said opposite and inner end having an annular edge portion, the axial position of said edge portion being determined by the axial position of said stem and sleeve member relative to said tubular member, and a plurality of annular members concentrically mounted in a series along said tubular member at fixed and uniformly successive positions along the axis of the tubular member adjacent the inner end thereof, said annular members being of uniform thickness and disposed in consecutive interengagement, the outer circumferential surface of each of said annular members carrying surface color indicia different from adjoining annular members in said series to provide for ready visual differentiation between the adjacent annular members, the length of said sleeve member relative to said tubular portion providing for the exposure to view of annular members upon movement of the sleeve member in any axial direction withdrawing the valve member from said valve seat and for the covering of annular members by the sleeve member within said annular space upon movement of the sleeve member in an axial direction advancing the valve member toward said valve seat, said annular edge portion showing the division between the covered and exposed annular members and observation of the number of exposed annular members to thereby indicate axial position of the sleeve member and stem and the position of the valve member relative to said valve seat.

4. Valve mechanism as defined in claim 3, in which said sleeve member adjacent said annular edge portion bears regularly spaced gradation marks to indicate rotational position of the sleeve member relative to a point of reference on the valve mechanism, and in which the sleeve member has an axially directed cutout portion along said annular edge portion at a fixed location around its circumference to expose an annular member in said annular space next adjacent said annular edge portion.

5. In a valve mechanism, means for visually indicating the position of a needle-type valve member relative to a valve seat within the valve mechanism by readily observable indicia, said needle-type valve member axially movable relative to the valve seat by rotation of the valve member on a threaded mounting, comprising in combination, a plurality of washer members of uniform thicknesses uniformly stacked and concentric with the axis of the valve member, said washer members being mounted in fixed and concentric spatial relationships relative to said valve seat, each of said washer members carrying a different color indicia on its outer circumferential surface for ready visual differentiation of said washer members, a sleeve member connected to the valve member to provide for simultaneous axial and rotational movement of the valve member and sleeve member together, said sleeve member having an open space at an end thereof for accommodating said washer members therein, axial movement of the sleeve member along said axis providing for covering and exposing relative amounts of said washer members by the sleeve member, said relative amounts of covered and exposed washer members indicating the position of the valve member relative to the said valve seat, the relative amounts of covered and exposed washer members being readily indicated by the color indicia of the exposed washer members, limit means having a portion carried by said sleeve member and a portion carried by said valve member and positioned to inter-engage with and limit the axial movement of the sleeve member along said axis away from said valve seat and relative to said washer members for retaining the sleeve member to said valve member, and locking means carried by the sleeve member for selectively locking the sleeve member at selected positions along said valve member relative to the position of said washer members to lock the needle-valve member in selected axial positions.

6. In a valve mechanism, means as defined in claim 5, and in which the sleeve member also bears a series of indicia extending around its circumferential surface for indicating relative to a point of reference the rotational phase of the sleeve member.

References Cited in the file of this patent

UNITED STATES PATENTS

| | | |
|---|---|---|
| 1,513,542 | Flagg | Oct. 28, 1924 |
| 1,688,390 | Lanza | Oct. 23, 1928 |
| 1,807,752 | Poster | June 2, 1931 |
| 2,558,687 | Krueger | June 26, 1951 |
| 2,613,906 | Weimar | Oct. 14, 1952 |
| 2,777,465 | Adams | Jan. 15, 1957 |
| 2,792,846 | Grieshaber | May 21, 1957 |
| 2,838,066 | Harris | June 10, 1958 |
| 2,841,174 | Frye | July 1, 1958 |